(12) United States Patent
Tseng et al.

(10) Patent No.: US 11,502,529 B2
(45) Date of Patent: Nov. 15, 2022

(54) BATTERY CHARGING METHOD EMPLOYING HISTORICAL DATA

(71) Applicant: PEGATRON CORPORATION, Taipei (TW)

(72) Inventors: Shih-Feng Tseng, Taipei (TW); Yi-Hsuan Lee, Taipei (TW); Wen-Lin Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 222 days.

(21) Appl. No.: 16/937,375

(22) Filed: Jul. 23, 2020

(65) Prior Publication Data
US 2021/0036531 A1 Feb. 4, 2021

(30) Foreign Application Priority Data
Jul. 29, 2019 (TW) .................................. 108126854

(51) Int. Cl.
*H02J 7/00* (2006.01)
*H01M 10/44* (2006.01)

(52) U.S. Cl.
CPC .......... *H02J 7/0048* (2020.01); *H02J 7/0071* (2020.01); *H02J 7/00714* (2020.01);
(Continued)

(58) Field of Classification Search
CPC ............... H02J 7/00712; H02J 7/00714; H02J 7/00716; H02J 7/00718; H02J 7/007182;
(Continued)

(56) References Cited

U.S. PATENT DOCUMENTS

| 5,621,458 A | * | 4/1997 | Mann | .................. G11B 33/122 368/41 |
| 5,754,029 A | * | 5/1998 | Mann | ...................... H04B 1/20 320/112 |

(Continued)

FOREIGN PATENT DOCUMENTS

| CN | 1617620 | 5/2005 |
| CN | 101694889 | 4/2010 |

(Continued)

OTHER PUBLICATIONS

"Office Action of China Counterpart Application", dated Aug. 5, 2021, p. 1-p. 7.

*Primary Examiner* — John T Trischler
(74) *Attorney, Agent, or Firm* — J.C. Patents

(57) ABSTRACT

A battery charging method is disclosed. The method includes: obtaining historical working durations in which the electronic device was powered by a battery of the electronic device; in response to an electronic device connected to a charging power source, obtaining a remaining battery level and a target capacity of a battery of the electronic device, and accordingly defining a capacity to be charged; obtaining a current system time when the electronic device is connected to the charging power source; obtaining a specific time difference between the current system time and a predicted working duration, wherein the predicted working duration is a specific working duration chosen from the historical working durations subsequent to the current system time; and using the capacity to be charged to correspond to the specific time difference to obtain a predicted charging current value.

9 Claims, 7 Drawing Sheets

(52) U.S. Cl.
CPC ............ *H01M 10/44* (2013.01); *H02J 7/0047* (2013.01); *H02J 7/00712* (2020.01); *H02J 7/007188* (2020.01)

(58) Field of Classification Search
CPC ........... H02J 7/007184; H02J 7/007186; H02J 7/008; H02J 7/0086; H02J 7/04; H02J 7/045; H02J 7/0048; H02J 7/0071
USPC ........................................................ 320/157
See application file for complete search history.

(56) References Cited

U.S. PATENT DOCUMENTS

| | | | | |
|---|---|---|---|---|
| 7,570,015 B2* | 8/2009 | Bansal | .................. | H02J 7/0069 320/106 |
| 8,421,414 B2* | 4/2013 | Lee | .................. | G06F 1/263 320/132 |
| 8,760,113 B2* | 6/2014 | Keating | ................ | H02J 7/0027 320/108 |
| 9,899,854 B2* | 2/2018 | Wei | ...................... | H02J 13/0075 |
| 9,995,591 B2* | 6/2018 | Shimizu | ................ | B60L 53/665 |
| 10,083,105 B2* | 9/2018 | de la Cropte de Chantérac | ......... | G06F 11/327 |
| 10,324,134 B2* | 6/2019 | Yang | ...................... | H02J 7/0047 |
| 10,444,290 B2* | 10/2019 | Kawamura | ................ | H02J 1/06 |
| 10,500,970 B2* | 12/2019 | Kawamura | ........... | H01M 16/00 |
| 10,663,521 B2* | 5/2020 | Yang | ...................... | H02J 7/0047 |
| 10,826,316 B2* | 11/2020 | Lin | ....................... | H04W 4/021 |
| 11,165,270 B2* | 11/2021 | Owen | .................... | H02J 7/0071 |
| 2003/0015993 A1* | 1/2003 | Misra | ................... | H02J 7/0071 320/125 |
| 2008/0218126 A1* | 9/2008 | Bansal | .................. | H02J 7/0069 320/132 |
| 2010/0123436 A1* | 5/2010 | Herrod | .................... | H02J 7/04 320/132 |
| 2010/0213895 A1* | 8/2010 | Keating | ................. | H02J 50/80 320/108 |
| 2011/0057605 A1* | 3/2011 | Chung | ................. | H02J 7/00716 320/107 |
| 2011/0109272 A1* | 5/2011 | Lee | ......................... | G06F 1/263 320/132 |
| 2011/0204852 A1* | 8/2011 | Saruhashi | ........... | H01M 10/441 320/134 |
| 2012/0053837 A1* | 3/2012 | Viassolo | ............. | H01M 10/482 702/1 |
| 2013/0049704 A1* | 2/2013 | Andou | .................... | G06F 1/263 320/162 |
| 2013/0271074 A1* | 10/2013 | Federico | ............. | B60L 15/2045 320/109 |
| 2014/0145684 A1* | 5/2014 | Liu | .......................... | B60L 53/14 320/152 |
| 2014/0191724 A1* | 7/2014 | Wojcik | ................. | H05K 5/0086 320/114 |
| 2014/0340051 A1* | 11/2014 | Hargrave | .............. | H02J 7/0077 320/162 |
| 2015/0048801 A1* | 2/2015 | Kessler | .............. | G01R 31/3842 324/426 |
| 2015/0127278 A1* | 5/2015 | Yang | ..................... | H02J 7/0049 702/60 |
| 2016/0064960 A1* | 3/2016 | DiCarlo | ................ | H02J 7/0047 320/134 |
| 2017/0040815 A1* | 2/2017 | Todasco | ................ | H02J 7/025 |
| 2017/0163067 A1* | 6/2017 | Altman | ..................... | H02J 7/00 |
| 2017/0282745 A1* | 10/2017 | Kawamura | ........... | H02J 7/0021 |
| 2017/0285109 A1* | 10/2017 | Kawamura | ........... | G01R 31/382 |
| 2019/0109483 A1* | 4/2019 | Huo | ...................... | H02J 7/0071 |
| 2019/0257887 A1* | 8/2019 | Yang | ..................... | H02J 7/0021 |
| 2020/0303938 A1* | 9/2020 | Owen | .................. | H01M 10/44 |
| 2021/0167620 A1* | 6/2021 | Yazami | ................ | H01M 10/44 |
| 2021/0362618 A1* | 11/2021 | Park | ................. | G06Q 10/06314 |

FOREIGN PATENT DOCUMENTS

| | | | | |
|---|---|---|---|---|
| CN | 105743190 | | 7/2016 | |
| CN | 106340922 | | 1/2017 | |
| EP | 3174176 | A1 * | 5/2017 | .......... H01M 10/443 |
| TW | 201042884 | | 12/2010 | |
| WO | 2017206107 | | 12/2017 | |

* cited by examiner

BATTERY CHARGING METHOD EMPLOYING HISTORICAL DATA

CROSS-REFERENCE TO RELATED APPLICATION

This application claims the priority benefit of Taiwan application serial no. 108126854, filed on Jul. 29, 2019. The entirety of the above-mentioned patent application is hereby incorporated by reference herein and made a part of this specification.

BACKGROUND

Field of the Disclosure

The disclosure relates to a charging method, and more particularly, to a battery charging method capable of providing various charging modes.

Description of Related Art

In the related art, the technology for charging portable electronic devices is usually relatively simple and inflexible. For example, when a portable electronic device is connected to a charging power source, its system will read the charging information provided by the battery module to charge the battery, or the system will directly utilize a fixed charging method (such as a fixed charging current) to charge the battery. However, since the above-mentioned conventional charging methods cannot learn the user's usage habits, the charging method cannot be optimized, which may cause the charging time to be unsatisfactory. In addition, the above method may also cause the problem that the battery is too old to use even though the user does not use the battery mode much.

SUMMARY OF THE DISCLOSURE

In view of this, the disclosure provides a battery charging method, which can be used to solve the above technical problems.

The disclosure provides a battery charging method adaptable for a portable electronic device. The method includes: obtaining a plurality of historical working durations in which the portable electronic device is powered by a battery of the portable electronic device; in response to a portable electronic device connected to a charging power source, obtaining a remaining battery level and a target capacity of a battery of the portable electronic device, wherein the target capacity is the capacity based on which charging on the battery of the portable electronic device is stopped; defining a capacity to be charged according to the target capacity and the remaining battery level; obtaining a current system time when the portable electronic device is connected to the charging power source; obtaining a specific time difference between the current system time and a predicted working duration, wherein the predicted working duration is a specific working duration chosen from the historical working durations subsequent to the current system time; and using the capacity to be charged to correspond to the specific time difference to obtain a predicted charging current value.

Based on the above, the battery charging method of the disclosure can present selections to the user in the form of a charging mode menu after obtaining the charging time required for charging the battery of the portable electronic device to the target capacity in different charging modes. In this way, users can choose the appropriate charging mode to charge the battery of the portable electronic device according to their own needs.

In order to make the above features and advantages of the present disclosure more comprehensible, embodiments are described below in detail with the accompanying drawings as follows.

DESCRIPTION OF EMBODIMENTS

Figure 1:
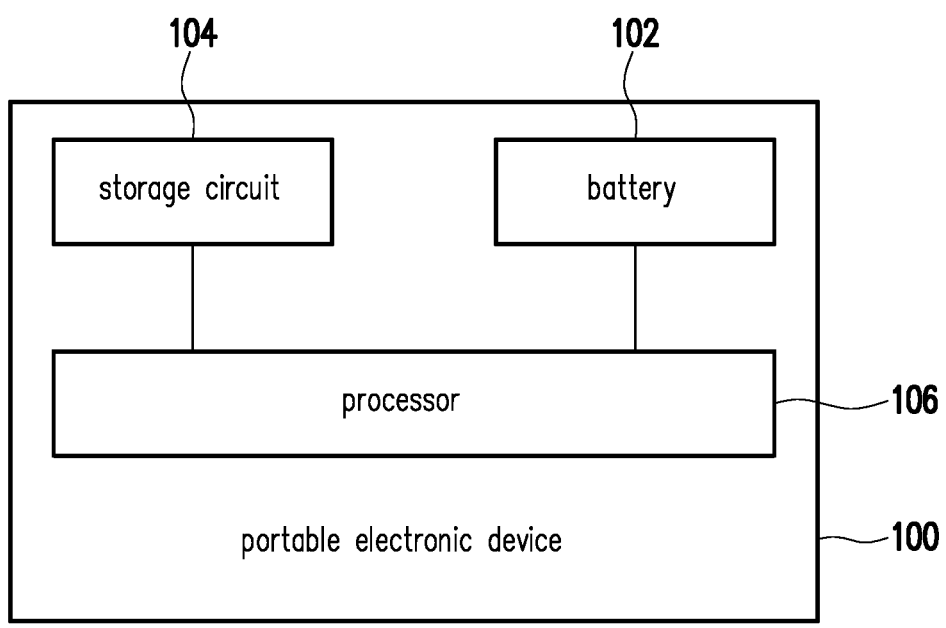
FIG. 1 is a schematic view of a portable electronic device according to an embodiment of the disclosure.

Please refer to FIG. 1, which is a schematic view of a portable electronic device according to an embodiment of the disclosure. In different embodiments, the portable electronic device 100 may be a notebook computer, a smart phone, a tablet computer, or other devices that can be powered by a battery, but the disclosure provides no limitation thereto.

As shown in FIG. 1, the portable electronic device 100 may include a battery 102, a storage circuit 104 and a processor 106. The battery 102 is, for example, a lithium battery or another type of rechargeable battery, which can be charged when the portable electronic device 100 is connected to a charging power source (such as a commercial power source), and can be utilized to supply power to the portable electronic device 100 when the charging power source is removed, but the disclosure is no limited thereto.

The storage circuit 104 is, for example, any type of fixed or removable random access memory (RAM), read-only memory (ROM), flash memory, hard disk or other similar device or a combination of these devices, which can be utilized to record multiple codes or modules.

The processor 106 is coupled to the battery 102 and the storage circuit 104, and may be a general-purpose processor, a specific-purpose processor, a conventional processor, a digital signal processor, multiple microprocessors, one or more microprocessors combined with the digital signal processor core, a controller, a microcontroller, application specific integrated circuits (ASICs), field programmable gate array (FPGAs) circuit, any other kind of integrated circuits, state machines, processors based on advanced RISC machine (ARM), and the like.

In the embodiment of the present disclosure, the processor 106 can access the modules and codes recorded in the storage circuit 104 to implement the battery charging method provided by the disclosure. The details are as follows.

Figure 2:
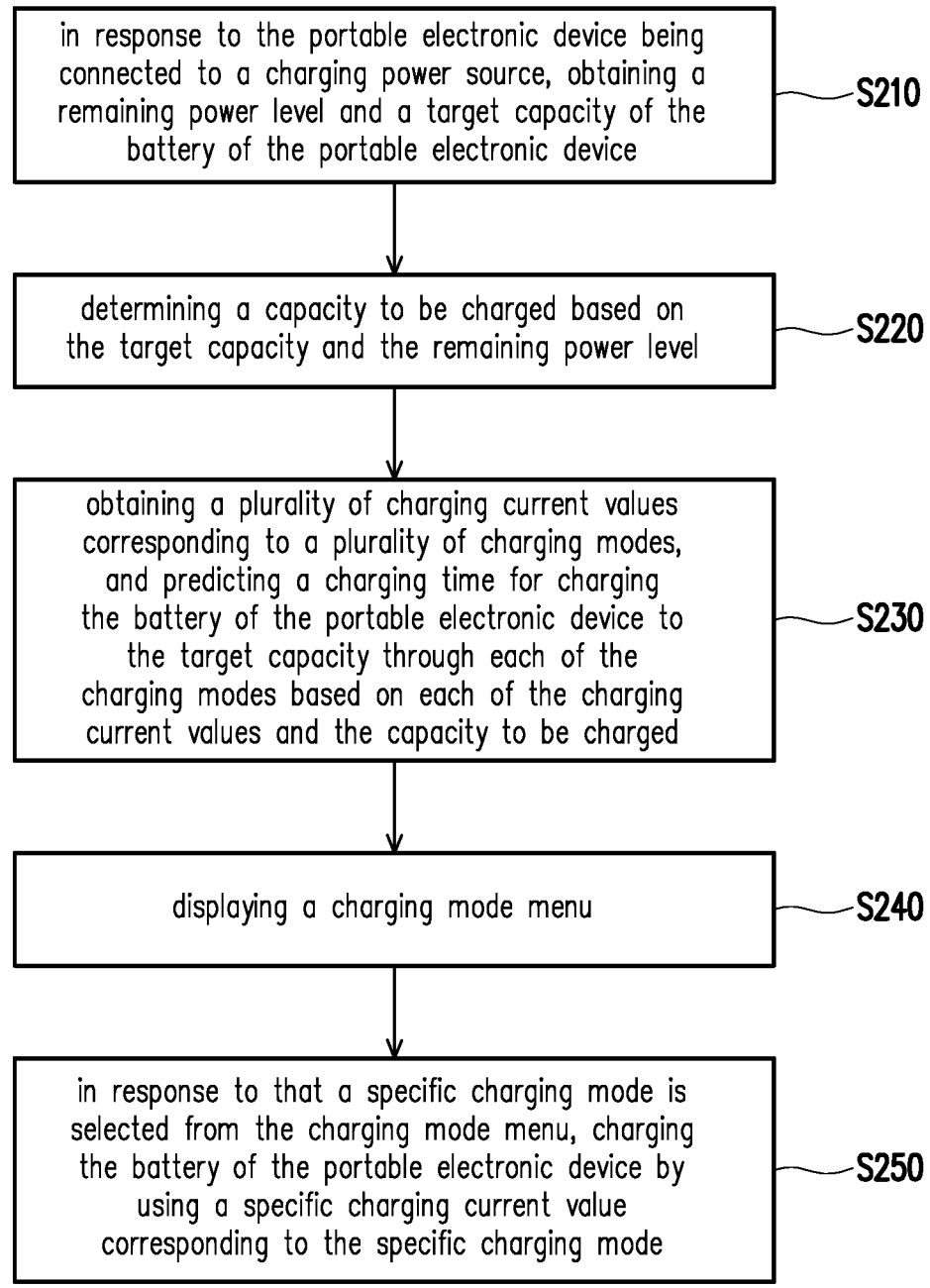
FIG. 2 is a flowchart of a battery charging method according to an embodiment of the disclosure.

Please refer to FIG. 2, which is a flowchart of a battery charging method according to an embodiment of the disclosure. The method of this embodiment may be executed by the portable electronic device 100 of FIG. 1, and the details of each step of FIG. 2 are described below with reference to the components shown in FIG. 1.

First, in step S210, in response to the portable electronic device 100 being connected to a charging power source, the processor 106 may obtain the remaining power level and the target capacity of the battery 102 of the portable electronic device 100. In this embodiment, the aforementioned remaining power level is, for example, the current power level (for example, 60%) when the portable electronic device 100 is connected to a charging power source, and the aforementioned target capacity is, for example, the capacity based on which charging on the portable electronic device 100 is stopped. For example, if the target capacity is set to 80% of the rated capacity of the battery 102, the processor 106 may stop charging the battery 102 when the battery 102 is charged to 80% of the rated capacity, but the disclosure is not limited thereto.

In an embodiment, the aforementioned target capacity may be the rated capacity of the battery 102, that is, the power level (which can be exhibited as 100%) when the battery 102 is fully charged. However, in other embodiments, the aforementioned target capacity can also be defined in other ways, and the details will be explained later.

In some embodiments, after obtaining the remaining power, the processor 106 can also determine whether the battery 102 needs to be charged according to the relevant specifications of the battery 102. For example, if the above specifications specify that it is not necessary to charge the battery 102 if the remaining power level of the battery 102 is higher than 95% of the rated capacity, the processor 106 may determine that it is not necessary to charge the battery 102 when the remaining power level is higher than 95% of the rated capacity, but the present disclosure is not limited thereto.

Then, in step S220, the processor 106 may define the capacity to be charged according to the target capacity and the remaining power level. In an embodiment, the capacity to be charged is, for example, the difference between the target capacity and the remaining power level, so the processor 106 may subtract the remaining power level from the target capacity to calculate the capacity to be charged. For example, if the target capacity is 100% and the remaining power level is 60%, then the capacity to be charged is 40% (i.e., 100%–60%), but the disclosure is not limited thereto.

In step S230, the processor 106 may obtain a plurality of charging current values corresponding to a plurality of charging modes, and predict the charging time required for charging the battery 102 of the portable electronic device 100 to the target capacity through various charging modes according to various charging current values and the capacity to the charged.

In different embodiments, the above-mentioned charging mode may include at least one of a first charging mode, a second charging mode, and a third charging mode, which are separately described below.

In an embodiment, the first charging mode (which may be referred to as a fast charging mode) may correspond to a first charging current value among the above-mentioned charging current values. Under the circumstances, the processor 106 may divide the capacity to be charged by the first charging current value to obtain a first charging time for charging the battery 102 of the portable electronic device 100 to the target capacity through the first charging mode.

In another embodiment, the second charging mode (which may be referred to as a general charging mode) may correspond to a second charging current value among the above-mentioned charging current values, and it may be smaller than the first charging current value. Under the circumstances, the processor 106 may divide the capacity to be charged by the second charging current value to obtain a second charging time for charging the battery 102 of the portable electronic device 100 to the target capacity through the second charging mode. Since the second charging current value is smaller than the first charging current value, the second charging time corresponding to the second charging mode should be longer than the first charging time corresponding to the first charging mode.

In yet another embodiment, the third charging mode (which may be referred to as a healthy mode) may correspond to a third charging current value among the above charging current values, and the third charging current value may be smaller than the second charging current value. Under the circumstances, the processor 106 may divide the capacity to be charged by the third charging current value to obtain a third charging time for charging the battery 102 of the portable electronic device 100 to the target capacity through the third charging mode. Since the third charging current value is smaller than the second charging current value, the third charging time corresponding to the third charging mode should be longer than the second charging time corresponding to the second charging mode.

In an embodiment, the first charging current value and the third charging current value may be the maximum charging current value and the minimum charging current value of the portable electronic device 100, respectively. In other words, the first charging time and the third charging time respectively represent the shortest time and longest time required for charging the battery 102 from the remaining power level to the target capacity, but the disclosure is not limited thereto.

Thereafter, in step S240, the processor 106 may display a charging mode menu. In different embodiments, the processor 106 may, for example, control a user interface (such as a touch screen) of the portable electronic device 100 to display a charging mode menu, and the charging mode menu may include at least one of the first, second, and third charging modes and its corresponding charging time for users to choose. Next, in step S250, in response to a specific charging mode being selected from the charging mode menu, a specific charging current value corresponding to the specific charging mode is utilized to charge the battery 102 of the portable electronic device 100. To make the concepts of steps S240 and S250 clearer, FIG. 3 is incorporated to facilitate comprehension of the following description.

Figure 3:
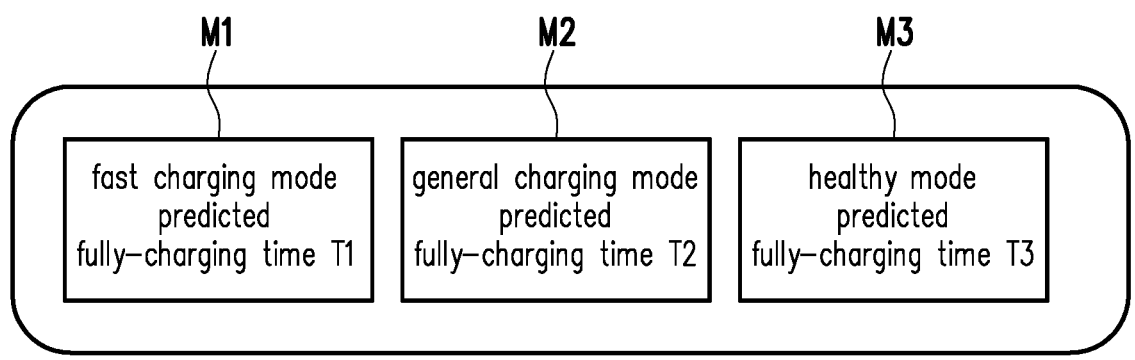
FIG. 3 is a schematic view of a charging mode menu according to an embodiment of the disclosure.

Please refer to FIG. 3, which is a schematic view of a charging mode menu according to an embodiment of the disclosure. In the embodiment, the charging mode menu 300 can be displayed by the portable electronic device 100 for the user's reference. As shown in FIG. 3, the charging mode menu 300 may include buttons M1, M2, and M3, which may correspond to the above-mentioned multiple charging modes.

Taking the button M1 as an example, it may correspond to the first charging mode (i.e., fast charging mode), and the previously obtained first charging time may be presented as a value T1. In this way, the user can understand that if the fast charging mode is selected (i.e., the fast charging mode is selected as the specific charging mode), it will take time T1 to fully charge (i.e. to charge to the target capacity) the battery 102 of the portable electronic device 100.

In addition, taking the button M2 as an example, it may correspond to the second charging mode (that is, the general charging mode), and the previously obtained second charging time may be presented as a value T2. In this way, the user can understand that if the general charging mode is selected (i.e., the general charging mode is selected as the specific charging mode), it will take time T2 to fully charge the battery 102 of the portable electronic device 100.

Taking the button M3 as an example, it may correspond to the third charging mode (that is, the healthy mode), and the previously obtained third charging time can be presented as a value T3. In this way, the user can understand that if the healthy mode is selected (i.e., the healthy mode is selected as the specific charging mode), it will take time T3 to fully charge the battery 102 of the portable electronic device 100.

As described in the previous embodiment, since the first charging current value is greater than the second charging current value and the second charging current value is greater than the third charging current value, the obtained first, second, and third charging time will be increasing in sequence. Under the circumstances, users can choose the appropriate charging mode according to their needs. For example, if the user determines that the charging power source will be removed after time T1, the user can select the fast charging mode as the specific charging mode through the button M1 to adopt the first charging current value (that is, the maximum charging current value) to perform fastest charging on the portable electronic device 100.

In another example, if the user determines that the charging power source will be removed after time T2, the user can select the general charging mode as the specific charging mode through the button M2 to adopt the second charging current value for charging the portable electronic device 100. Since the second charging current value is smaller than the first charging current value, the battery 102 can be charged in a relatively moderate condition, thereby extending the service life of the battery 102.

In another example, if the user determines that the charging power source will be removed after time T3, the user can select the healthy mode as the specific charging mode by using the button M3 to adopt the third charging current value (i.e., the minimum charging current value) for charging the portable electronic device 100 in the most moderate manner, thereby further extending the service life of the battery 102.

As can be seen from the above, the battery charging method of the disclosure can present selections to the user in the form of a charging mode menu after obtaining the charging time required for charging the battery of the portable electronic device to the target capacity in different charging modes. In this way, users can choose the faster or more moderate charging mode to charge the battery of the portable electronic device according to their own needs.

In other embodiments, the charging mode may further include a learning mode. Different from the first, second, and third charging modes described above, the charging current value corresponding to the learning mode of the disclosure is not a fixed value, but is estimated based on a certain mechanism. Specific description is provided below.

Figure 4:
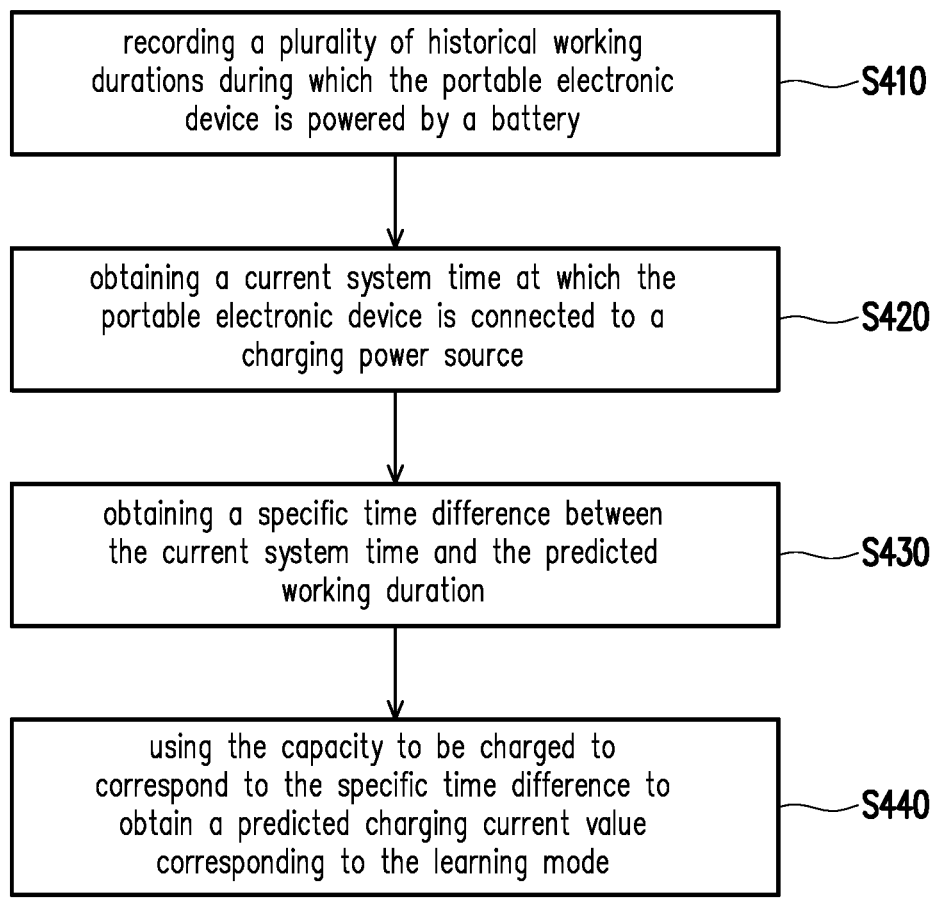
FIG. 4 is a flowchart illustrating obtaining a predicted charging current value corresponding to a learning mode according to an embodiment of the disclosure.

Please refer to FIG. 4, which is a flowchart illustrating obtaining a predicted charging current value corresponding to a learning mode according to an embodiment of the disclosure. The method of this embodiment may be executed by the portable electronic device 100 of FIG. 1, and the details of each step in FIG. 4 are described below with reference to the components shown in FIG. 1.

First, in step S410, the processor 106 may record a plurality of historical working durations when the portable electronic device 100 is powered by the battery 102. In different embodiments, when the portable electronic device 100 is not connected to a charging power source, the processor 106 may record the start time point and the end time point at which the portable electronic device 100 operates in a working state (e.g., state S3) as well as the remaining power level at the end time point as a historical working duration. In addition, in some embodiments, the above historical working durations may also be recorded in a specific database for the processor 106 to access when needed, but the disclosure is not limited thereto.

For example, if the user had the portable electronic device 100 operate in a working state when being powered by the battery 102 someday in the morning between 10:00 and 11:30, the processor 106 may respectively record "10:00" and "11:30" as the start time point and end time point of a historical working duration, and record the remaining power level of the battery 102 at the above end time point. In other words, if the portable electronic device 100 operates in a working state (or enters a sleep state) when it is connected to a charging power source, the processor 106 will not record related information as a historical working duration, but the disclosure may not be limited thereto.

Then, in step S420, the processor 106 can obtain the current system time of the portable electronic device 100 connected to the charging power source, and obtain a specific time difference between the current system time and the predicted working duration in step S430. In an embodiment, the processor 106 may predict the time point at which the next working duration may appear after the current system time according to the previously recorded historical working duration, and define it as the predicted working duration. That is, the aforementioned predicted working duration can be regarded as the next possible working duration after the current system time, and the predicted working duration can be, for example, a specific working duration selected from the above historical working durations subsequent to the current system time.

In an embodiment, the predicted working duration and the current system time may both belong to a first week, and the specific working duration may belong to a second week prior to the first week, and the time point and length of the predicted working duration in the first week correspond to the time point and length of the specific working duration in the second week. Moreover, there are no other predicted working durations between the current system time and the predicted working duration.

For example, suppose the current system time is 9:00 on Monday evening, and the processor 106 found that only a historical working duration was recorded at 10:00 on Tuesday morning last week, during which the portable electronic device was powered by the battery 102 and operated in the working state for one hour. Therefore, the processor 106 can predict that there may be a working duration at 10:00 on Tuesday morning this week, at which the portable electronic device will be powered by the battery 102 for one hour. Under the circumstances, the processor 106 may define a working duration starting at 10:00 on Tuesday morning this week and lasting for one hour as the predicted working duration.

After finding the predicted working duration, the processor 106 can obtain a specific time difference between the predicted working duration and the current system time. In continuation of the previous example, the specific time difference obtained by the processor 106 is, for example, the time difference between 10:00 on Tuesday morning this week (corresponding to the predicted working duration) and 9:00 on Monday evening (that is, the current system time), which is 13 hours, which should not be construed as a limitation to the disclosure.

After obtaining the specific time difference, in step S450, the processor 106 may use the capacity to be charged to correspond to the specific time difference to obtain a predicted charging current value corresponding to the learning mode. For example, assuming that the capacity to be charged is P mAh, in the above example, the processor 106 may divide P by 13 hours to obtain the predicted charging current value corresponding to the learning mode, but the disclosure is not limited thereto.

In an embodiment, if the obtained predicted charging current value is greater than the maximum charging current value (i.e., the first charging current value) of the portable electronic device 100, the processor 106 may set the predicted charging current value to be equal to the maximum charge current value. On the other hand, if the predicted charging current value is smaller than the minimum charging current value (i.e., the third charging current value) of the portable electronic device 100, the processor 106 may set the predicted charging current value to be equal to the minimum charging current value. In addition, in response to that the predicted charging current value is between the maximum charging current value and the minimum charging current value of the portable electronic device 100, the predicted charging current value may not be changed.

After obtaining the predicted charging current value corresponding to the learning mode, the processor 106 may divide the capacity to be charged by the predicted charging current value to obtain a predicted charging time required for charging the battery 102 of the portable electronic device 100 to the target capacity through the learning mode (i.e., step S230).

Thereafter, the processor 106 may display the learning mode and its corresponding predicted charging time together on the charging mode menu for the user to select.

Figure 5:
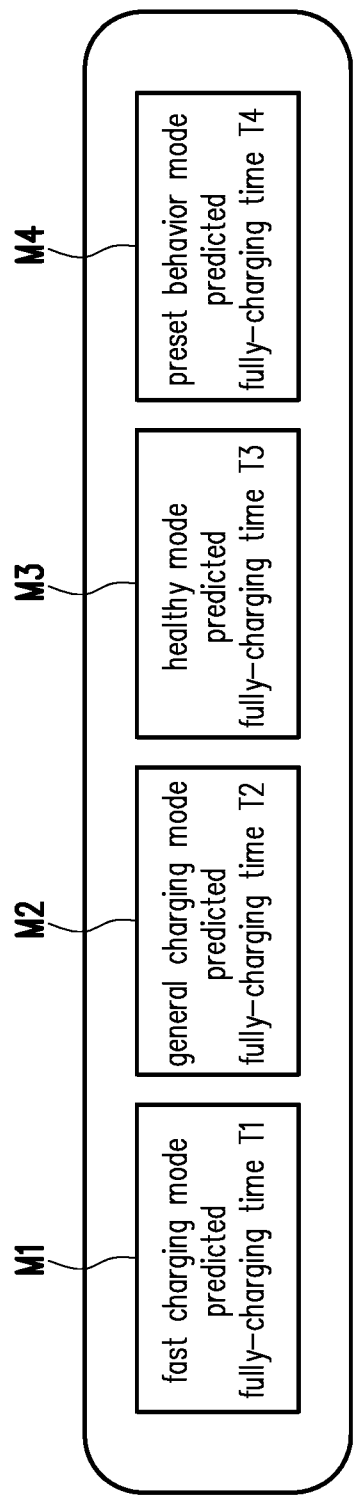
FIG. 5 is a schematic view of a charging mode menu according to an embodiment of the disclosure.

Please refer to FIG. 5, which is a schematic view of a charging mode menu according to an embodiment of the disclosure. As shown in FIG. 5, the charging mode menu 500 may include buttons M1, M2, M3, and M4, and details about the buttons M1 to M3 may be derived from the description in the foregoing embodiment, and are not repeated here. In this embodiment, the button M4 may correspond to a learning mode (which may be referred to as a preset behavior mode), and the previously obtained predicted charging time may be presented as a value T4. In this way, the user can understand that if the learning mode is selected (that is, the learning mode is selected as the specific charging mode), it will take time T4 to fully charge (i.e., charging to the target capacity) the battery 102 of the portable electronic device 100.

If the user determines that the charging power source will be removed after time T4, the user can select the preset behavior mode as the specific charging mode through the button M4 to adopt the predicted charging current value to charge the portable electronic device 100 with the charging method most suitable for the usage behavior.

In an embodiment, after the charging mode menu 500 is displayed, if the user does not select any charging mode within a preset time (for example, 5 seconds), the processor 106 may automatically select the learning mode as the specific charging mode, and use the predicted charging current value corresponding to the learning mode to charge the battery 102 of the portable electronic device 100, but the disclosure is not limited thereto.

As can be seen from the above, in addition to providing one or more charging modes corresponding to a fixed charging current value for the user to select, the disclosure can also provide a learning mode that is generated through learning the user's past usage behaviors for the user to select, thereby charging the battery of the portable electronic device in a way that best matches the user behavior.

Figure 6:
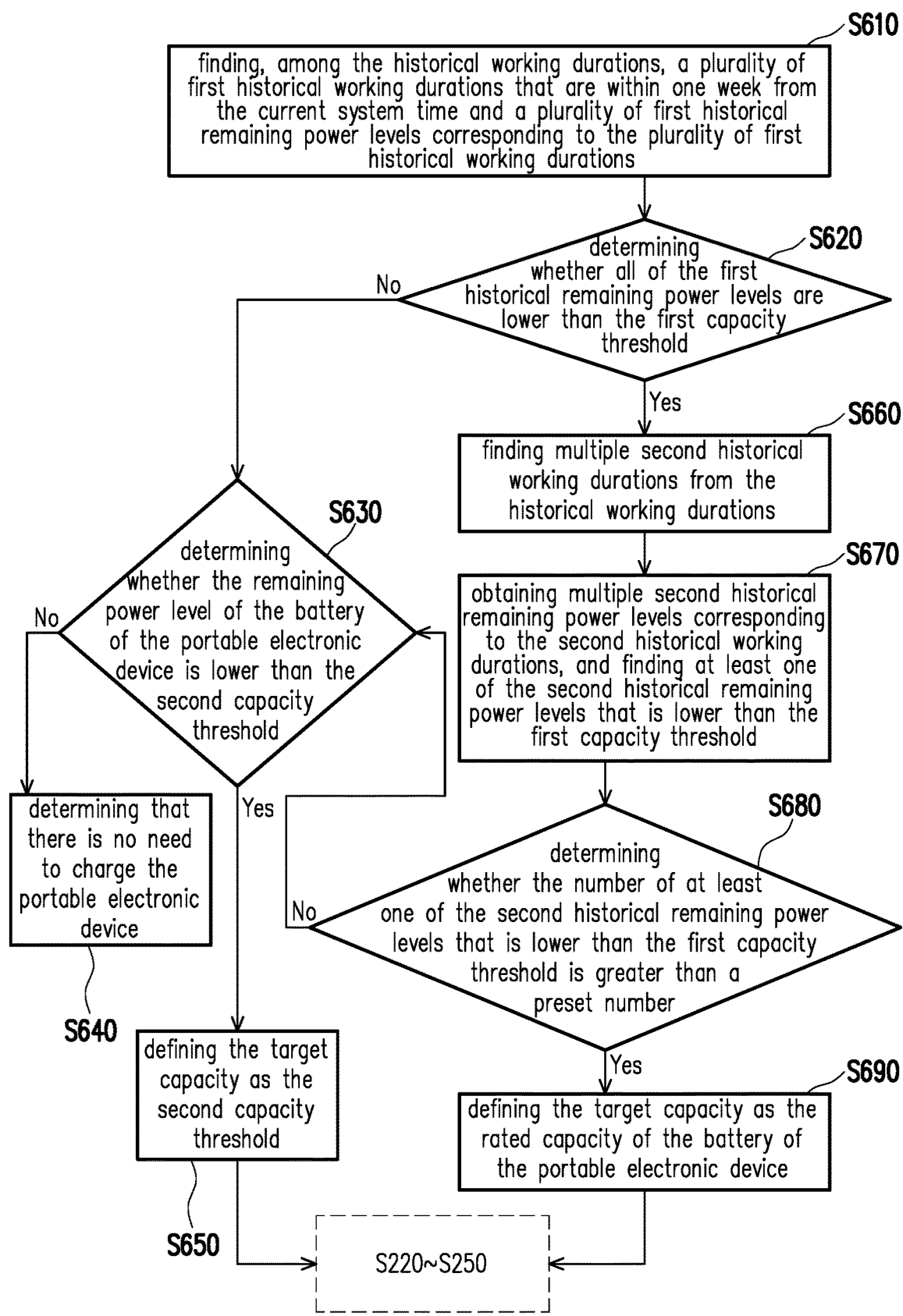
FIG. 6 is a flowchart of obtaining a target capacity according to an embodiment of the disclosure.

In addition, as described in the foregoing embodiment, the target capacity considered by the disclosure can be determined through a certain mechanism, which will be described in detail below. Please refer to FIG. 6, which is a flowchart of obtaining a target capacity according to an embodiment of the disclosure. The method of this embodiment may be executed by the portable electronic device 100 of FIG. 1, and the details of each step in FIG. 6 are described below with reference to the components shown in FIG. 1.

First, in step S610, the processor 106 can find, among the historical working durations, a plurality of first historical working durations that are within one week from the current system time and a plurality of first historical remaining power levels corresponding thereto. For example, assuming that the current system time is 10:00 on Monday evening, the processor 106 may define the historical working durations between the current system time and 10:00 last Monday evening as well as the corresponding remaining power levels as the first historical working durations and the first historical remaining power levels respectively.

In step S620, the processor 106 may determine whether all of the first historical remaining power levels are lower than the first capacity threshold. In different embodiments, the first capacity threshold may be set to 70% of the rated capacity, or a value determined by other designers according to needs, but the disclosure is not limited thereto.

In an embodiment, if all of the first historical remaining power levels are not lower than the first capacity threshold, it means that the user demand for power supply for the portable electronic device 100 might not be high in the past week, so the processor 106 may continue to determine in step S630 whether the remaining power level of the battery 102 of the portable electronic device 100 is lower than the second capacity threshold. In different embodiments, the second capacity threshold may be set to 80% of the rated capacity, or a value determined by other designers according to needs, but the disclosure is not limited thereto.

If the processor 106 determines that the remaining power level of the battery 102 of the portable electronic device 100 is not lower than the second capacity threshold, it means that the remaining power level of the battery 102 should be sufficient for the user to use, so step S640 may be executed subsequently to determine that there is no need to charge the portable electronic device 100.

On the other hand, if the processor 106 determines that the remaining power level of the battery 102 of the portable electronic device 100 is lower than the second capacity threshold, it means that the remaining power level of the battery 102 may be insufficient. In addition, since the user demand for power supply is not high, the processor 106 can execute step S650 to define the target capacity as the second capacity threshold (for example, 80% of the rated capacity). Thereafter, the processor 106 may continue to execute steps S220 to S250 to charge the battery 102. In this manner, it is possible to prevent the processor 106 from charging the battery 102 to an excessively high level of capacity, thereby improving the health of the battery 102.

In an embodiment, if the processor 106 determines in step S620 that all of the first historical remaining power levels are lower than the first capacity threshold, it means that the user demand for power supply for the portable electronic device 100 might be high in the past week, so the processor 106 may continue to execute step S660 to find multiple second historical working durations from the historical working durations. In the embodiment, the difference between each of the second historical working durations and the current system time is within one month and corresponds to the same weekday. For example, assuming that the current system time is 9:00 on Monday evening, the processor 106 may define all the historical working durations that occurred on Monday in the past month as the second historical working durations. In another example, assuming that the current system time is 10:00 on Sunday morning, the processor 106 may define all the historical working durations that occurred on Sunday in the past month as the second historical working durations, but the disclosure is not limited thereto.

Thereafter, in step S670, the processor 106 may obtain multiple second historical remaining power levels corresponding to the second historical working durations, and find at least one of the second historical remaining power levels that is lower than the first capacity threshold.

In step S680, the processor 106 may determine whether the number of at least one of the second historical remaining power levels that is lower than the first capacity threshold is greater than a preset number. In different embodiments, the preset number is, for example, 2 or another value greater than 2 as determined by the designer according to needs. In an embodiment, if the number of at least one of the second historical remaining power levels that is lower than the first capacity threshold is greater than a preset number, it reflects that the user has a higher demand for power supply, so the processor 106 may continue to perform step S690 to define the target capacity as the rated capacity (i.e., 100%) of the battery 102 of the portable electronic device 100. Thereafter, the processor 106 may continue to perform steps S220 to S250 to charge the battery 102. In this way, it is possible for the processor 106 to charge the battery 102 to a fuller state afterwards to meet the user's demand for power supply.

On the other hand, if the amount of at least one of the second historical remaining power levels that is lower than the first capacity threshold is not greater than the preset number, it means that the user demand for power supply might not be high, so the processor 106 may continue to perform step S630 to determine whether the remaining power level of the battery 102 of the portable electronic device 100 is lower than the second capacity threshold. If yes, then proceed to step S650, otherwise proceed to step S640, and the related details can be derived from the previous description, and will not be repeated here.

In an embodiment, the disclosure also provides another battery charging method, which can directly use the learning mode as a specific charging mode to charge the battery 102 of the portable electronic device 100.

Figure 7:
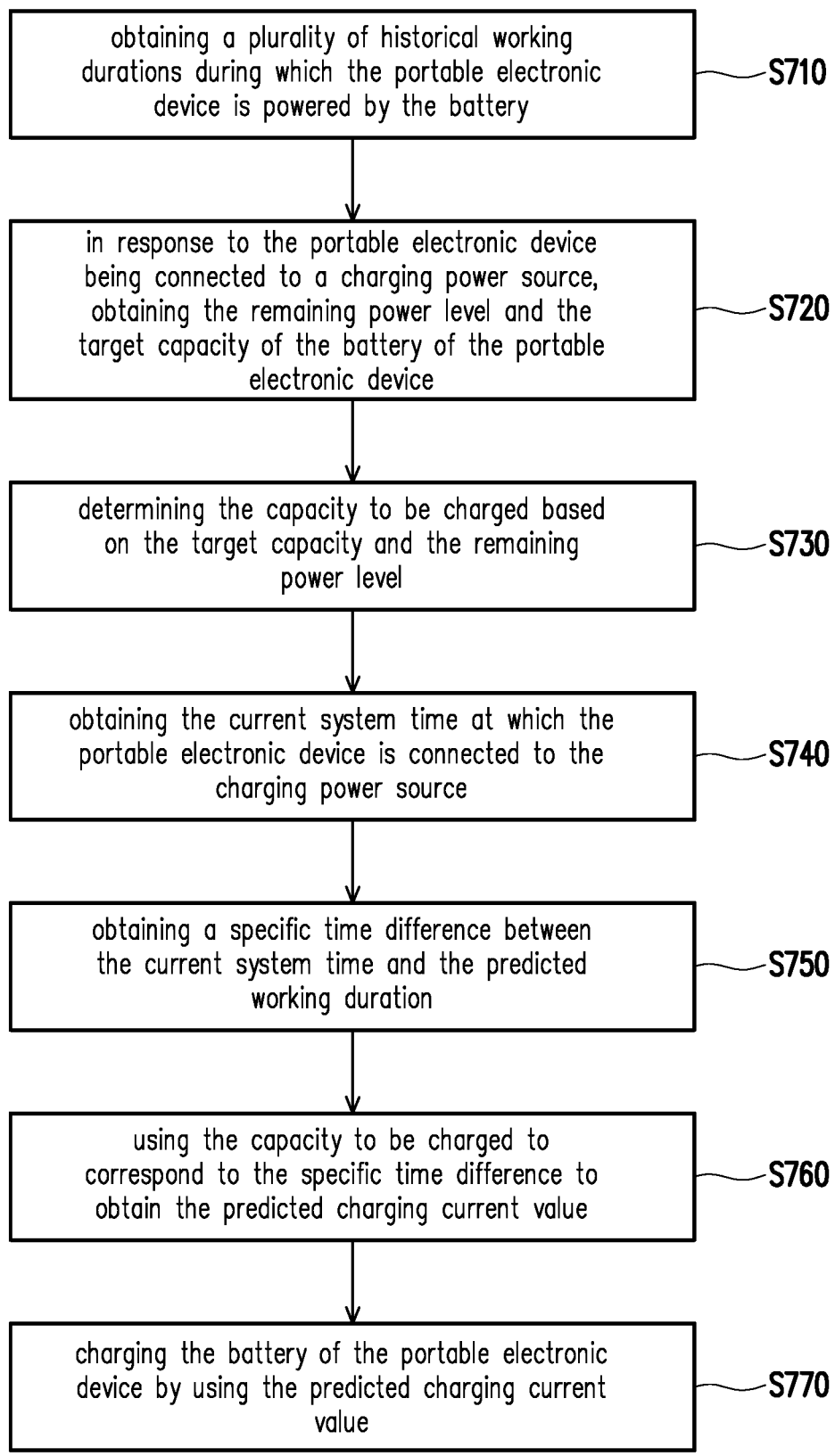
FIG. 7 is a flowchart of a battery charging method according to an embodiment of the disclosure.

Please refer to FIG. 7, which is a flowchart of a battery charging method according to an embodiment of the disclosure. The method of this embodiment can be executed by the portable electronic device 100 of FIG. 1, and the steps in FIG. 7 are described below with the components shown in FIG. 1.

In step S710, the processor 106 may obtain a plurality of historical working durations during which the portable electronic device is powered by the battery. In step S720, in response to the portable electronic device 100 being connected to a charging power source, the processor 106 may obtain the remaining power level and the target capacity of the battery 102 of the portable electronic device 100. In step S730, the processor 106 may determine the capacity to be charged based on the target capacity and the remaining power level. In step S740, the processor 106 can obtain the current system time at which the portable electronic device 100 is connected to the charging power source. In step S750, the processor 106 may obtain a specific time difference between the current system time and the predicted working duration. In step S760, the processor 106 may use the capacity to be charged to correspond to the specific time difference to obtain the predicted charging current value. In step S770, the processor 106 may charge the battery 102 of the portable electronic device 100 by using the predicted charging current value. For details of each step in FIG. 7, please refer to the description about the corresponding steps in FIG. 2, FIG. 4, and FIG. 6, which will not be repeated here.

It should be understood that the various time length units (such as month, week, hour, etc.) mentioned in the embodiment can be adjusted by the designer to an appropriate time length unit according to the needs, and is not limited to the form disclosed above.

In summary, the battery charging method of the disclosure can present selections to the user in the form of a charging mode menu after obtaining the charging time required for charging the battery of the portable electronic device to the target capacity in different charging modes. In this way, users can choose the faster or more moderate charging mode to charge the battery of the portable electronic device according to their own needs. From another point of view, the method of the disclosure can avoid the situation that the battery of the portable electronic device has a shortened service life due to bearing the unnecessary large current, and can also prevent the problem that the battery cannot be immediately charged to the sufficient capacity because the charging current is too small.

In addition, other than providing one or more charging modes corresponding to a fixed charging current value for the user to select, the disclosure may also provide a learning mode that is generated through learning the user's past usage behavior for the user to choose, thereby charging the battery of the portable electronic device in a way that best matches the user's behavior.

Moreover, the disclosure can also define the value of the target capacity according to the user demand for power supply. In this manner, it is possible to avoid unnecessary charging on the battery of the portable electronic device to an excessively high level capacity, so as to improve the health of the battery. In the meantime, when the user has a higher demand for power supply, a higher target capacity can be set to allow the battery to be charged to a fuller state, thereby meeting the user demand for power supply.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A battery charging method suitable for a portable electronic device, comprising:
    obtaining, by the portable electronic device, a plurality of historical working durations of the portable electronic device powered by a battery of the portable electronic device, wherein each of the historical working durations is a duration during which the portable electronic device operates in a working state;
    in response to the portable electronic device being connected to a charging power source, obtaining, by the portable electronic device, a remaining power level and a target capacity of the battery of the portable electronic device, wherein the target capacity is a capacity based on when charging of the battery of the portable electronic device is stopped, and the step of obtaining the target capacity comprises:
finding, by the portable electronic device among the historical working durations, a plurality of first historical working durations that are within one week from the current system time and a plurality of first historical remaining power levels corresponding to the plurality of first historical working durations;
in response to that all of the first historical remaining power levels are not lower than a first capacity threshold, and in response to that the remaining power level of the battery of the portable electronic device is not lower than a second capacity threshold, determining, by the portable electronic device, that the portable electronic device does not need to be charged; and
in response to that all of the first historical remaining power levels are not lower than a first capacity threshold, and in response to that the remaining power level of the battery of the portable electronic device is lower than the second capacity threshold, defining, by the portable electronic device, the target capacity as the second capacity threshold;
determining, by the portable electronic device, a capacity to be charged based on the target capacity and the remaining power level;
obtaining, by the portable electronic device, a current system time of the portable electronic device connected to the charging power source;
obtaining, by the portable electronic device, a specific time difference between the current system time and a predicted working duration, wherein the predicted working duration is selected from a specific working duration among the historical working durations subsequent to the current system time; and
using, by the portable electronic device, the capacity to be charged to correspond to the specific time difference to obtain a predicted charging current value.

2. The method according to claim 1, further comprising:
in response to the predicted charging current value being between a maximum charging current value and a minimum charging current value of the portable electronic device, using the predicted charging current value to charge the battery of the portable electronic device;
in response to the predicted charging current value being greater than the maximum charging current value of the portable electronic device, setting the predicted charging current value to be equal to the maximum charging current value; and
in response to the predicted charging current value being smaller than the minimum charging current value of the portable electronic device, setting the predicted charging current value to be equal to the minimum charging current value.

3. The method according to claim 1, wherein the predicted working duration and the current system time belong to a first week, the specific working duration belongs to a second week prior to the first week, and a time point and a length of the predicted working duration in the first week correspond to a time point and a length of the specific working duration in the second week.

4. The method according to claim 1, wherein the step of obtaining the target capacity further comprises:

in response to that one of the plurality of first historical remaining power levels is lower than the first capacity threshold, finding a plurality of second historical working durations among the plurality of historical working durations, wherein each of the second historical working durations is within one month from the current system time and corresponds to the same weekday;
obtaining a plurality of second historical remaining power levels corresponding to the plurality of second historical working durations, and finding at least one of the second historical remaining power levels lower than the first capacity threshold; and
in response to that the number of the at least one of the second historical remaining power levels lower than the first capacity threshold is greater than a preset number, defining the target capacity as a rated capacity of the battery of the portable electronic device.

5. The method according to claim 4, wherein in response to that the number of the at least one of the second historical remaining power levels lower than the first capacity threshold is not greater than the preset number, the method further comprises:
in response to that the remaining power level of the battery of the portable electronic device is not lower than the second capacity threshold, determining that the portable electronic device does not need to be charged; and
in response to that the remaining power level of the battery of the portable electronic device is lower than the second capacity threshold, defining the target capacity as the second capacity threshold.

6. The method according to claim 1, wherein the predicted charging time corresponds to a learning mode, and the method further comprises:
obtaining a plurality of charging current values corresponding to a plurality of charging modes, and predicting a charging time for charging the battery of the portable electronic device to the target capacity through each of the charging modes based on each of the charging current values and the capacity to be charged;
displaying a charging mode menu, wherein the charging mode menu comprises the learning mode, the predicted charging time, the charging modes and the corresponding charging times; and
in response to that the learning mode is selected from the charging mode menu, charging the battery of the portable electronic device by using the predicted charging current value corresponding to the learning mode; and
in response to that a specific charging mode among the charging modes is selected from the charging mode menu, charging the battery of the portable electronic device by using a specific charging current value corresponding to the specific charging mode.

7. The method according to claim 6, wherein the charging modes comprise a first charging mode, the first charging mode corresponds to a first charging current value among the charging current values, and the step of predicting the charging time for charging the battery of the portable electronic device to the target capacity through each of the charging modes based on each of the charging current values and the capacity to be charged comprises:
dividing the capacity to be charged by the first charging current value to obtain a first charging time for charging the battery of the portable electronic device to the target capacity through the first charging mode.

8. The method according to claim 7, wherein the charging modes further comprise a second charging mode, and the second charging mode corresponds to a second charging current value among the charging current values, the second charging current value is smaller than the first charging current value, and the step of predicting the charging time for charging the battery of the portable electronic device to the target capacity through each of the charging modes based on each of the charging current values and the capacity to be charged comprises:

dividing the capacity to be charged by the second charging current value to obtain a second charging time for charging the battery of the portable electronic device to the target capacity through the second charging mode.

9. The method according to claim 8, wherein the charging modes further comprise a third charging mode, and the third charging mode corresponds to a third charging current value among the charging current values, the third charging current value is smaller than the second charging current value, and the step of predicting the charging time for charging the battery of the portable electronic device to the target capacity through each of the charging modes based on each of the charging current values and the capacity to be charged comprises:

dividing the capacity to be charged by the third charging current value to obtain a third charging time for charging the battery of the portable electronic device to the target capacity through the third charging mode, wherein the first charging current value and the third charging current value are respectively the maximum charging current value and the minimum charging current value of the portable electronic device.

* * * * *